United States Patent
Bone et al.

(10) Patent No.: US 10,903,509 B2
(45) Date of Patent: Jan. 26, 2021

(54) FUEL CELL

(71) Applicant: Ceres Intellectual Property Co. Ltd., Horsham (GB)

(72) Inventors: Adam Bone, Horsham (GB); Robert Leah, Horsham (GB); Subhasish Mukerjee, Horsham (GB); Mahfujur Rahman, Horsham (GB); Ahmet Selcuk, Horsham (GB)

(73) Assignee: CERES INTELLECTUAL PROPERTY CO. LTD., West Sussex (GB)

( * ) Notice: Subject to any disclaimer, the term of this patent is extended or adjusted under 35 U.S.C. 154(b) by 100 days.

(21) Appl. No.: 16/083,453

(22) PCT Filed: Mar. 8, 2017

(86) PCT No.: PCT/GB2017/050622
§ 371 (c)(1),
(2) Date: Sep. 7, 2018

(87) PCT Pub. No.: WO2017/153751
PCT Pub. Date: Sep. 14, 2017

(65) Prior Publication Data
US 2019/0051916 A1 Feb. 14, 2019

(30) Foreign Application Priority Data
Mar. 9, 2016 (GB) .................................. 1604044.6

(51) Int. Cl.
| | | |
|---|---|---|
| *H01M 8/0273* | (2016.01) | |
| *H01M 8/0232* | (2016.01) | |
| *H01M 8/0282* | (2016.01) | |
| *H01M 8/1286* | (2016.01) | |

(Continued)

(52) U.S. Cl.
CPC ....... *H01M 8/0273* (2013.01); *H01M 8/0232* (2013.01); *H01M 8/0282* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 5,589,285 A | * | 12/1996 | Cable | H01M 8/0271 429/479 |
| 2001/0007381 A1 | * | 7/2001 | Kleinlogel | C04B 35/50 264/660 |

(Continued)

FOREIGN PATENT DOCUMENTS

| | | |
|---|---|---|
| DE | 102011011107 A1 | 8/2012 |
| GB | 2524640 A | 9/2015 |

OTHER PUBLICATIONS

PCT; International Search Report and Written Opinion dated Mar. 8, 2017 in the International Application No. PCT/GB2017/050622.

*Primary Examiner* — Kaity V Chandler
(74) *Attorney, Agent, or Firm* — Snell & Wilmer L.L.P.

(57) ABSTRACT

The invention relates to metal supported solid oxide fuel cells (SOFC), fuel cell stacks containing the same, methods of their manufacture and use thereof. The SOFC of the invention utilises an extended electrolyte and barrier layers to prevent specific types of corrosion of the metal substrate. This new coating approach reduces the rate of degradation of the fuel cells and improves system reliability when operated over long durations.

16 Claims, 13 Drawing Sheets

(51) Int. Cl.
  *H01M 8/126* (2016.01)
  *H01M 8/2425* (2016.01)
  *H01M 8/124* (2016.01)
  *H01M 8/2432* (2016.01)

(52) U.S. Cl.
  CPC ......... *H01M 8/126* (2013.01); *H01M 8/1286* (2013.01); *H01M 8/2425* (2013.01); *H01M 8/2432* (2016.02); *H01M 2008/1293* (2013.01); *Y02E 60/50* (2013.01); *Y02P 70/50* (2015.11)

(56) References Cited

U.S. PATENT DOCUMENTS

| | | | |
|---|---|---|---|
| 2002/0048699 A1* | 4/2002 | Steele | H01M 8/0217 429/465 |
| 2008/0107949 A1* | 5/2008 | Yoshie | H01M 8/04201 429/410 |
| 2008/0248361 A1* | 10/2008 | Larsen | H01M 8/2404 429/515 |
| 2009/0226786 A1 | 9/2009 | Selcuk | |
| 2010/0136376 A1 | 6/2010 | Leah | |
| 2011/0143038 A1* | 6/2011 | Bone | C23C 18/1208 427/380 |
| 2011/0269047 A1* | 11/2011 | Tucker | H01M 4/9033 429/452 |
| 2014/0051006 A1 | 2/2014 | Hwang | |
| 2015/0064596 A1* | 3/2015 | Leah | H01M 4/8825 429/465 |
| 2015/0064597 A1* | 3/2015 | Leah | C23C 18/02 429/465 |
| 2016/0233534 A1* | 8/2016 | Leah | H01M 8/126 |
| 2017/0012292 A1* | 1/2017 | Minegishi | H01M 4/8828 |

* cited by examiner

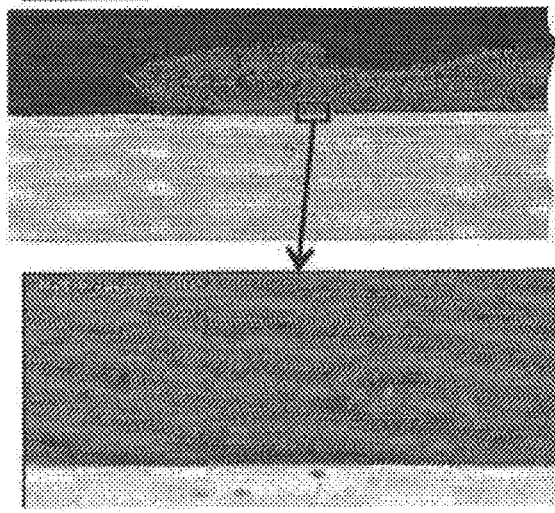
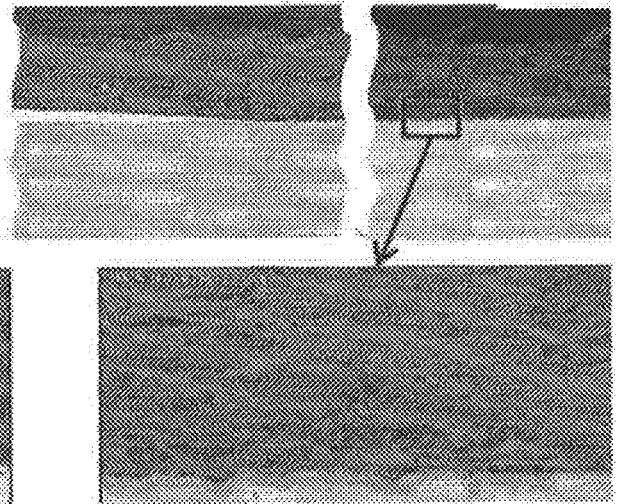
Figure 13a
Figure 13b
Figure 13c
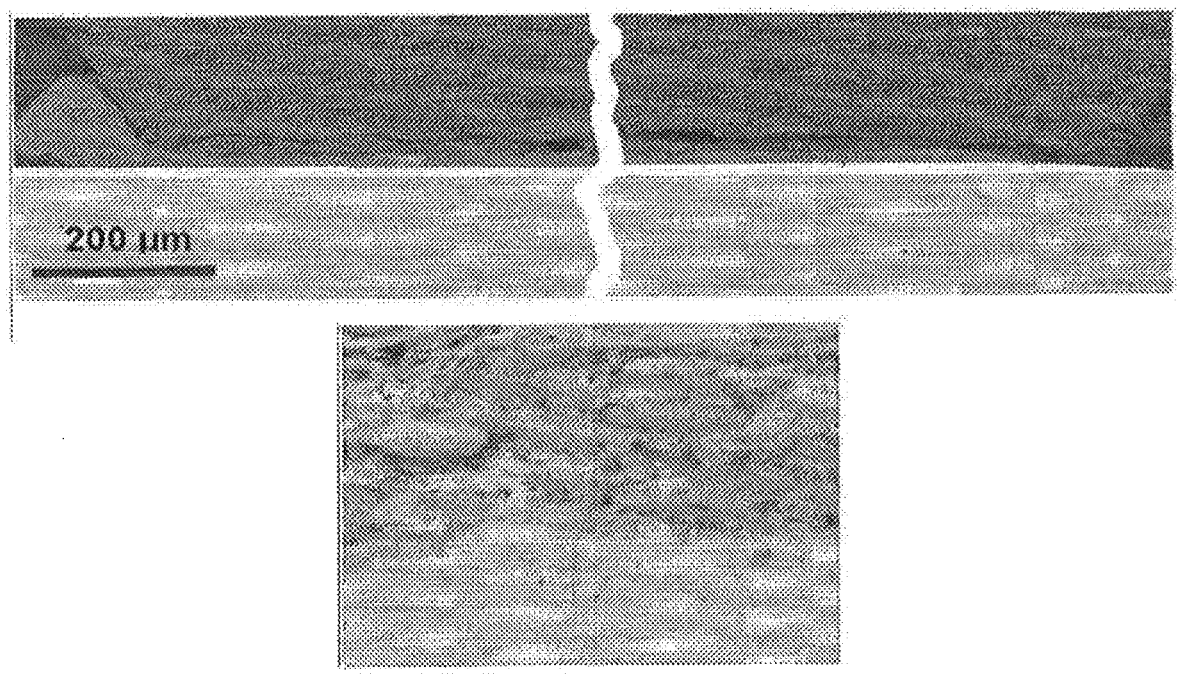
Figure 14

FUEL CELL

CROSS-REFERENCE TO RELATED APPLICATIONS

This application is a U.S. national phase filing under 35 U.S.C. § 371 of PCT/GB2017/050622 filed on Mar. 8, 2017 which claims priority from Great Britain Patent Application No. GB 1604044.6 filed on Mar. 9, 2016, which applications are hereby incorporated by reference in their entirety.

FIELD OF INVENTION

The invention relates to a corrosion-resistant, metal-supported solid oxide fuel cell (SOFC), methods of making said SOFCs, SOFC stacks comprising said SOFCs, methods of preparing said SOFCs, and the use of said fuel cells in the generation of electricity.

BACKGROUND OF INVENTION

The use of fuel cells as an alternative to conventional fuel combustion processes for the generation of energy has been known for many years. Many fuel cell systems have been developed including solid oxide fuel cells. A solid oxide fuel cell (SOFC) is an electrochemical device for the generation of electrical energy through the electrochemical oxidation of a fuel gas (usually hydrogen-containing).

The SOFC typically uses an oxygen-ion conducting metal-oxide derived ceramic as its electrolyte. Single SOFCs are connected together into large fuel cell "stacks". Under operation, the SOFCs and SOFC stacks produce direct electrical current which can be used as a power source to drive electrical loads for a range of applications. Examples of existing SOFC fuel cell systems include those of Ceres Power as described in patent application GB 2 368 450A.

SOFCs operate at high temperatures (typically above 450° C.) over long periods of time in the presence of oxygen and other reactive fluids. SOFCs typically operate as electrochemical devices with an oxidant environment on one side of the SOFC—traditionally called the cathode side of the fuel cell, and a reducing environment on the other side of the SOFC—traditionally called the anode side of the fuel cell. Accordingly, in order for SOFC to withstand such conditions for the lifetime of a typical SOFC product, which may be in the many thousands of hours of operation including cycling on and off and up and down in power output, the SOFCs must have a robust construction. This requires the electrochemical layers of the SOFC to have a supporting substrate with good thermal, mechanical and stable chemical properties so that the SOFC resists degradation and maintains its performance for the lifetime of the product. Accordingly, for SOFC technologies having an operating temperature between 450° C. and 650° C., such as that described in GB 2 368 450A, metals can be used as the supporting substrate and stainless steel is often a desirable choice of material. For SOFC technologies that have an operating temperature greater than 700° C., the use of metal for the SOFC and the SOFC stack is limited due to the performance and degradation that occurs due to oxidizing of the metal surfaces.

Unfortunately, even corrosion-resistant materials (such as stainless steel) can be prone to degradation under these intense operating conditions. In particular, surface oxidation can occur and a build-up of metal oxide can form that leads to weakening and potentially failure of the supporting metal substrate. These oxide layers can also form under the SOFC electrochemical layers coating the metal substrate, leading to an increase in electronic resistance. If the oxidation continues, it can lead to the oxide layer growing to such a thickness that it separates the electrochemical layer from the metal layer and/or part of the oxide layer spalls away from the metal surface. These effects in turn damage the SOFC, reduce performance and can cause SOFC failure.

Further, in order to connect a plurality of SOFCs together into a SOFC stack, it is often the case that fixtures or gaskets are applied to the SOFC (which co-operate with corresponding portions of the fixtures or gaskets on adjacent SOFC layers) in order to form a series of sealed chambers into which appropriate oxidizing and reducing fluids can be applied to and from the SOFC layers in the stack. For metal supported SOFCs, it has been found that the materials from which these fixtures or gaskets are made can have a significant effect on corrosion of the metal substrate. These fixture or gasket portions of the SOFC can degrade under SOFC operation and they can release materials which seed the corrosion and/or can promote corrosion of fuel cell metal substrates. This metal corrosion can lead to a loss in material from the metal substrate which in turn can lead to metal substrate thickness loss, mechanical weakening and potentially the formation of a gas leakage path from one side of the metal substrate to the other side.

Thus it is possible to get undesirable metal substrate corrosion occurring as a result of the operating atmosphere in which the SOFC operates and a reaction with certain materials released from the SOFC fixtures or gaskets.

In a previous publication (D. Szymczewskaa, S. Molinb, M. Chenb, P. V. Hendriksenb, P. Jasinskia, "Ceria based protective coatings for steel interconnects prepared by spray pyrolysis", 11th International Symposium on Systems with Fast Ionic Transport, ISSFIT 11, Procedia Engineering 98 (2014) 93-100, herein referred to a "Ref [1]"), thin ceria coatings (with up to 400 nm thickness) have been shown to have potential for application as protective coatings on fuel side of Crofer 22APU interconnects working in dual atmosphere.

Whilst there have been other publications on the corrosion observed on metal plates used in SOFC as interconnects such as "The effect of duel atmosphere conditions on the corrosion of Sandvik Sanergy HT", A. Werner, B. Skilbred, R. Haugsrud; International Journal of Hydrogen Energy 37 (2012) 809 5-8101; "Effects of water vapour on oxidation behaviour of ferritic stainless steels under solid oxide fuel cell interconnect exposure conditions", Z. Yang, G. Xia, P. Singh, J. Stevenson, Solid State Ionics 176 (2005) 1495-1503; "Oxidation behaviour of Fe-16Cr alloy interconnect for SOFC under hydrogen potential gradient", H. Kurokawa, K. Kawamura, T. Maruy; and "Severe dual atmosphere effect at 600 C for stainless steel 441", P. Alnegren, M. Sattari, J. Svensson, Journal of Power Sources 301 (2016) 170-178, there has been very little discussion on how corrosion occurs on the air side of the SOFC metal substrate let alone techniques that can be used to mitigate said corrosion. This lack of study is perhaps not surprising as the use of metal-supported SOFC is limited to a very few companies and is a non-trivial technology to master.

Therefore, it is desirable to provide a SOFC architecture which has improved resistance to both forms of corrosion discussed above under SOFC operating conditions.

The invention is intended to overcome or at least ameliorate some of this problem.

SUMMARY OF INVENTION

There is provided in the first aspect of the invention, a metal-supported solid oxide fuel cell (SOFC) comprising: a metal substrate; an electrolyte layer adjacent the substrate; at least one gasket through which fluids are delivered to and/or from the cell; wherein the electrolyte layer provides a non-porous protective coating preventing corrosion of the substrate; and wherein at least a portion of the electrolyte layer is positioned between the substrate and the gasket and/or on the air side of the substrate in regions proximate to the gasket.

The inventors have discovered that where fixtures, such as gaskets that provide engagement between SOFCs, are attached to a SOFC (in particular, where they are attached to the metal substrate of a SOFC) and the SOFC operates, this promotes corrosion of the metal substrate in and around these fixtures with corrosion starting on the air side of the metal substrate.

Without being bound by theory, it is believed that when the SOFC is in use, particularly in a stack, material from the gasket and other such fixtures attached to the SOFC is leeched out of said fixtures and is deposited onto regions of the substrate between said fixtures and the active area of the SOFC. Typically, the "active area" of the SOFC is that portion of the SOFC coated with electrochemically active materials which include: electrolytes, anodes and cathodes. It has surprisingly been found that materials deposited on the surface of the exposed substrate on the air side of the substrate (i.e. that surface area of the metal substrate between the active area of the cell and the gasket) often oxidize during SOFC operation and subsequently-formed oxides then react with the substrate material. Typically, metal from the substrate (such as iron) is drawn out of the substrate and reacts with the surface-deposited oxide forming an oxide.

Without being bound by theory, it is also thought that the chromia layer prevents diffusion of the oxygen into the bulk metal and also of the iron in the bulk metal coming out. It appears that under operating conditions, the material coming from the gasket reacts with the chromia creating a second phase. Under SOFC operating conditions, there is apparent inhibition of chromia diffusion from the bulk metal to the surface of the metal as a result of the presence of dissolved hydrogen. Thus any damage to the chromia scale is 'repaired' by replenishment by new chromia coming from the bulk metal underneath the damaged area. With the damaged chromia protection layer not reforming, it leaves an unprotected region of metal surface. Under the SOFC operating conditions, this exposed area is likely to have some iron which will tend to oxidize in the SOFC operating environment on the air side of the substrate, forming a porous and non-passivating oxide, which gradually spreads across the surface and the substrate material change grows into the bulk substrate metal.

Over time, this corrosion process draws more and more of the substrate metal out of the substrate and leads to local substrate material composition change and weakening thereof. This type of corrosion occurs even with conventionally corrosion-resistant materials such as stainless steel.

The inventors of the present invention have realized that by extending the electrolyte layer such that it covers at least a portion of the region between the fixtures on the SOFCs (e.g. the gasket) and the active region of the SOFC with electrolyte, corrosion of the substrate can be greatly mitigated. This is surprising as the purpose of the electrolyte layer is not to act as a corrosion-resistant material and furthermore, the electrolyte layer is typically capable of transporting ionic oxygen throughout the electrolyte layer and so would be expected to promote, rather than prevent, corrosion of the substrate. This modification to the metal substrate allows SOFCs to be run for a longer period of time because it greatly improves the corrosion resistance of the SOFCs.

In the situation where the electrolyte layer used to coat the air side of the metal substrate, covering the region between the fixtures on the SOFCs (e.g. the gasket) and the active region of the SOFC with electrolyte is the same electrolyte layer as that used to form the electrolyte (or part of the electrolyte) between the anode and the cathode of the active area of the SOFC, then typically this electrolyte has a thickness of greater than 5 μm, more typically in the range 5 μm to 100 μm, even more typically 10 μm to 50 μm, and more typically still in the range 12 μm to 15 μm. In the situation where the electrolyte layer used to coat the region between the fixtures on the SOFCs (e.g. the gasket) and the active region of the SOFC with electrolyte is not the same electrolyte layer as that used to form the electrolyte (or part of the electrolyte) between the anode and the cathode of the active area of the SOFC, then typically this electrolyte layer has a thickness of greater than 1 μm, more typically in the range 2 μm to 50 μm, even more typically 2 μm to 10 μm, and more typically still in the range 2 μm to 5 μm. The thickness of the electrolyte layer influences permeability of the electrolyte layer when normal, high-volume manufacturing processes are considered. If the layer is too thin, under SOFC operation reactant gases may be able to penetrate the layer and react with the underlying substrate or anode. However, thicker layers require more material and increase both the weight and manufacturing costs of the SOFC. The optimal thickness of the electrolyte layer is as described herein.

For the avoidance of doubt, the term "electrolyte layer" is not to be construed as consisting only of a "layer of electrolyte" but should be construed as meaning "a layer comprising electrolyte material". Other materials, including non-electrolyte or non-conducting materials may be included and the electrolyte layer may be made up of more than one layer of electrolyte material.

Further, the term "adjacent" is not intended to be limited to direct adjacency. Accordingly, additional layers may be incorporated between the electrolyte layer and the substrate. However, the term "adjacent" may mean directly adjacent and it is typically the case that the electrolyte layer is directly adjacent to the substrate. It is typically the case that the electrolyte layers are directly adjacent to the substrate, as this reduces the numbers of materials and manufacturing steps required to complete the SOFC.

The term "gasket" is intended to take its traditional meaning in the art and refers to those portions of the SOFC and SOFC stack which allow multiple SOFCs to be sealingly connected to one another, so that reaction fluids can be delivered to the appropriate sides of the SOFCs when in use, particularly in SOFC stack arrangements. The electrolyte layer is "non-porous" in the sense that it prevents reactant gases penetrating through the electrolyte layer from one side to the other and reaching the underlying layers. Typically the electrolyte layer is substantially non-porous to all fluids, and more typically all gases. However, it is more typically the case that the electrolyte layer is substantially non-porous with respect to dihydrogen and dioxygen, typically dioxygen. This prevents oxygen and hydrogen from penetrating through the electrolyte layer to the underlying substrate and promoting the particular type of corrosion described above.

The gasket may be located on the air side of the SOFC of the system. Typically, the gasket is located on the SOFC itself. Further, it is typically the case that the gasket is located on the air side of the SOFC system.

The SOFC of the invention may have several different architectures. Firstly, it is envisaged that the electrolyte layer covers not only the underlying substrate but also may cover substantially all of the SOFC surface such that the gasket may be placed directly on top of this electrolyte layer, typically towards the periphery of the electrochemically active areas of the SOFC. Alternatively, the gasket may be attached directly onto the supporting metal substrate and the electrolyte layer may cover the electrochemically active area of the SOFC as well as those regions proximate to the gasket but not necessarily beneath the gasket. The term "proximate" as used herein, is intended to mean those areas surrounding the gasket which when the SOFC is in operation do not form part of the active surface of the SOFC but are sufficiently close to the gasket that impurities from the gasket are capable of being deposited thereon. It is typically the case that regions proximate to the gasket are those regions extending in the range of equal to or less than 30 mm from the gasket. More typically less than 25 mm from the gasket, even more typically less than 15 mm and more typically still less than 5 mm from the gasket. It would typically be the case that the regions proximate to the gasket are equal to or less than 2 mm from the gasket and may be equal to or less than 1 mm from the gasket.

It is typically the case that the electrolyte layer is positioned between the substrate and the gasket. The inventors have found that corrosion can occur directly beneath the gasket, where the gasket is in direct contact with the substrate even though it is more difficult for reactant gases and corrosive fluids to contact this region. Further, failure to prevent corrosion beneath the gasket can lead to a lateral growth of corrosion both through the depth and also across the supporting substrate.

Typically, the electrolyte layer is positioned on the substrate in regions proximate to the gasket and most typically is also positioned between the substrate and the gasket. It is most typically the case that the electrolyte layer forms a continuous layer between the gasket and the substrate as well as covering those regions proximate to the gasket and the active surface of the SOFC. This is typically done for the purposes of ease of manufacture as the electrolyte layer can be applied to this entire area before the gasket is fixed to the SOFC. In some embodiments the electrolyte layer may be applied to the entire surface of the SOFC or alternatively, a small region of uncoated substrate may be provided around the perimeter of the SOFC to improve the ease with which the cell is handled during manufacture and SOFC stack assembly, avoiding damaging the electrolyte layer.

In certain cases it may be that the electrolyte layer or a first electrolyte layer is positioned over the whole surface of the SOFC metal substrate in a way that the electrolyte layer is positioned between the active layers of the SOFC and the metal substrate. In the case where this is a first electrolyte layer, then a second electrolyte layer may then extend from the electrolyte positioned between the anode and the cathode layers to cover the first electrolyte layer. In such circumstances the first electrolyte layer may be only 1 μm thick or even less than 1 μm thick, with the second electrolyte layer being >1 μm thick, and together the first and second electrolyte layer combined to form a layer >2 μm thick and less than 20 μm thick.

The inventors have found that good corrosion prevention is achieved wherein the sintered electrolyte coating has a thickness of >2 μm, and typically >5 μm thick. For simplicity of manufacturing, the sintered electrolyte coating layer thickness can be the same as that used for the main electrolyte layer or electrolyte layers. During the SOFC manufacturing process, the electrolyte may be made up from more than one layer and more than one material. The effective corrosion layer may be formed from one of these layers subject to the layer being a dense coating and >2 μm, and preferably >5 μm. The coating may be applied as the same coating that forms the electrolyte or may be a separate coating deposition that covers the uncoated areas of the substrate. Such coating process may be achieved by selective screen printing or spray deposition such as by controlled ink-jet or jetting techniques.

It is typically the case that an additional protective non-porous barrier layer is provided, which is positioned such that the electrolyte layer is between the barrier layer and the substrate. The inventors have found that including an additional anti-corrosion layer (i.e. a barrier layer) between the electrolyte layer and the gasket, leads to a further improvement in corrosion resistance, without hindering the performance of the SOFC.

There is provided in another embodiment of the invention, a metal-supported SOFC comprising: a metal substrate; at least one gasket through which fluids are delivered to and/or from the cell; a protective non-porous barrier layer to prevent corrosion of the substrate; wherein at least a portion of the barrier layer is positioned on the air side of the substrate in regions proximate to the gasket.

As an alternative to the above embodiment, instead of the electrolyte layer being extended to cover those regions of the metal substrate susceptible to corrosion, a specific barrier layer may be provided to cover the regions proximate to the gasket, thereby preventing the specific corrosion phenomena discovered by the applicant. This barrier layer may also extend beneath the gasket such that the barrier layer is positioned between the gasket and the substrate. Although gaskets coated and/or "backed" with corrosion resistant materials are known in the art, such systems are typically provided to prevent undesirable interactions between gaskets and the substrates to which they are fixed. The particular corrosion phenomena described herein occurs not just between the gasket and the substrate where the two contact one another but also in those uncoated substrate regions proximate to the gasket, due to the leeching of key materials and the specific corrosion phenomena described above.

It is typically the case that the SOFC metal substrate is an iron containing substrate, i.e. the substrate comprises the element iron. This may be an alloy which includes iron (i.e. wherein the main component of the alloy is iron), a material which includes iron as a dopant or additive, or even pure iron. Typical examples of iron-containing substrates are steels. There is no particular limitation on the choice of steel which is used, however it is typically the case that the steel is stainless steel and more typically ferritic stainless steel as this demonstrates excellent mechanical and thermal stability for SOFC applications and has a very close thermal expansion coefficient match to the SOFC as described in GB 2 368 450A and related patents and SOFC designs of the applicant. Without being limited by substrate metal type, examples of suitable stainless steel materials include those such as Crofer 22 APU and H, Hitachi ZMG 232, EU designate 1.441 and 1.459.

The metal substrate may have a thickness in the range about 50 to 250 μm, often about 50 to 150 μm, in some cases about 100 μm. The thickness of the substrate is determined by the need to provide a stable substrate, which does not significantly change shape or warp during cell processing, assembly or in use, yet which is as thin as possible to allow efficient contact between the fuel and the anode. As described in GB 2 368 450A, this contact can be achieved with excellent results by the provision of a porous region bounded by a non-porous region of the substrate, over which the anode is formed. It will often be the case that the porous region of the substrate includes a plurality of through apertures fluidly interconnecting the one and other surface of the substrate, often these apertures will be uniformly spaced, additionally or alternatively having a lateral separation of from about 5 to 500 µm, or from about 20 to 250 µm, or of about 120 µm. Further, the apertures may comprise from about 1 to 65 area % of the porous region of the substrate or from about 5 to 35 area % of the porous region of the substrate. The aperture may be formed by laser drilling, erosion or etching or a combination. The diameter of the aperture may not be the same on each side of the substrate, and the smaller diameter aperture is typically 5-100 µm diameter, more typically 10-50 µm diameter, more typically 20-35 µm diameter. Each of these features contribute to an efficient transfer of fuel reactant gas (reformate, hydrogen, CO or unreformed gas or a combination thereof) through the substrate to the anode and reacted and unreacted fuel away from the anode, whilst allowing the metal substrate to support the SOFC, facilitating the use of dramatically reduced thicknesses of the electrochemically active layers within the cell. Typically the substrate will be a thin metal sheet or foil, although a sintered substrate could also be used. The advantage of foils is the ease of control of the structure of the porous region and the simplicity of handling during SOFC manufacture.

There is no particular limitation on the choice of electrolyte material used in the present invention. The electrolyte is a solid electrolyte and typically has a melting point greater than 450° C. and more typically greater than 600° C. The electrolyte is usually a ceramic material having oxygen-ion conducting properties. Typically this is an oxide such as a rare earth oxide, examples of which include, but are not limited to, oxides of zirconium, yttrium, scandium, cerium or combinations thereof. More typically still, the electrolyte is a cerium oxide which may be doped with one or more dopants. Typically, the electrolyte is a cerium gadolinium oxide which may have the formula $Ce_{0.9}Gd_{0.1}O_{1.95}$. Typical dopants that can be used with the electrolyte include cobalt, samarium or combinations thereof. It is typically the case that the cerium gadolinium oxide further comprises cobalt. The amount of cobalt present in the cerium gadolinium oxide is typically in the range 2% to 20%, and more typically is about 5% to 15%, and most typically about 10%.

As is typical, the SOFC includes an anode and a cathode in order to allow electricity to be delivered to and from the SOFC. Typically, both electrodes are provided as layers of material adjacent to the electrolyte and the substrate layers. The anode layer is usually positioned between the substrate and the electrolyte layer and the electrolyte layer is usually positioned between the anode layer and the cathode layer. Examples of typical anode and cathode materials as well as SOFC architectures comprising anode and cathodes of the invention are described in GB 2 368 450A, GB 2 524 638, GB 2 524 640, GB 2 400 486, GB 2 386 126, GB 2 517 927, GB 2 517 928, GB 2 522 522, GB 2 440 038.

An anode layer is typically deposited directly onto the substrate, an electrolyte layer is placed over the anode layer and a cathode layer is then applied directly onto the electrolyte layer. The substrate comprises one or more apertures which allows reactant gases to pass through the apertures and contact the anode layer and for reacted and unreacted gases to pass back from the anode layer through the substrate.

Typically, the anode is a composite cermet which may be formed from a mixture of the electrolyte material and a metal (usually a metal oxide). Typically, the anode is fabricated as a film with a thickness between 5 and 30 µm. The anode is generally deposited by screen-printing an ink containing metal oxide and powders of the electrolyte material which is subsequently then thermally processed into a porous cermet layer bonded to the metal substrate. Usually, the metal oxide is nickel oxide.

The cathode may comprise a sintered powdered mixture of a perovskite oxide mixed conductor and ceramic material, typically a rare earth-doped ceria, such as gadolinium doped ceria. The perovskite may comprise $La_{1-x}Sr_xCo_yFe_{1-y}O_{3-d}$, where $0.5 \geq x \geq 0.2$ and $1 \geq y \geq 0.2$. In particular, the perovskite oxide mixed conductor may comprise one or more of $La_{0.6}Sr_{0.4}Co_{0.2}Fe_{0.8}O_{3-\delta}$, $La_{0.5}Sr_{0.5}CoO_{3-\delta}$, $Gd_{0.5}CoO_{3-\delta}$, and $Sm_{0.5}Sr_{0.5}CoO_{3-d}$. Other cathode materials include LCN60/CGO, for example $La_{0.99}Co_{0.4}Ni_{0.6}O_{3-\delta}$ and $Ce_{0.9}Gd_{0.1}O_{1.95}$ or 60/40% PSC552/CGO. It can be useful to use these compounds as they have a higher ionic conductivity than most perovskites, and similar thermal expansion co-efficients to rare earth-doped ceria, reducing the stress between cathode and electrolyte in use. In some cases, the mixture comprises in the range 20 to 50 wt % rare earth-doped ceria, in some cases 30 to 45 wt %, in some cases 35 to 45 wt %, or around 40 wt % rare earth-doped ceria as defined above. This helps to enhance the compatibility between the cathode and electrolyte both chemically and in terms of the thermal expansion described above, and as these ceria have high charge transfer rates, their inclusion ensures a good rate of charge transfer between the electrolyte and the cathode.

The cathode will generally be sintered before use. The cathode will typically be applied as one or more layers (for instance as an active layer and a current collecting layer, which is sometimes referred to as a bulk layer) directly or indirectly over the sintered electrolyte and sintered under conditions similar to those described above for the anode. This provides an intermediate temperature metal supported SOFC, which is robust to repeated REDOX cycling, and as a result of the anode structure formed, to fuel deprivation whilst at temperatures up to operating temperatures.

Examples of techniques used to manufacture SOFCs of the present invention, in particular methods of forming cermet electrodes and electrolyte layers on metal substrates such as ferritic stainless steel, are disclosed in GB 2 368 450A, GB 2 386 126 and GB 2 400 486.

It is typically the case that the gasket which is incorporated onto SOFCs of the invention is made from a material suitable for SOFC operation and typically comprises one or more materials. The inventors have found that some of these materials are corrosion promoting agents used with metal substrate supported SOFC and when at operating temperatures on the air side of the metal substrate. A "corrosion promoting agent" is intended to include any element or compound which is capable of being leeched from the gasket under the operating conditions of a SOFC, wherein said element or compound, when deposited on the exposed surface of the metal substrate, forms an oxide and consequently draws metal out of the substrate. Typically corrosion promoting agents include: Group 1 elements, Group 7 elements, silicon, sulfur, or combinations thereof. Typically, the corrosion promoting agents are potassium, fluorine, sodium and silicon or combinations thereof. These corrosion promoting agents have been found to be the most damaging agents when deposited on exposed substrate in regions proximate to the gasket.

Typically, the gasket is made from a thermally robust material and is typically a ceramic, metallic or cermet based material or for metal supported SOFC's that operate in the 450° C.-650° C. range, it is possible to use non-conducting clay-form gaskets. Often, the gasket is made from a non-electrically conductive layer. Typically, the clay-type gaskets comprise silicates and in particular may comprise vermiculite, talc or a combination thereof. Examples known in the art of metal-supported SOFC's include compression gaskets, such as vermiculite, talc or mixtures thereof based gaskets. One such example of a vermiculite-based gasket is from Flexitallic, such as Thermiculite® 866 (T866) or 866LS. T866 is based on chemically exfoliated vermiculite with no organic binders and remains mechanically and chemically safe at typical metal SOFC operating temperatures.

Regarding the barrier layer, it is typically the case that the barrier layer is substantially non-porous to fluids, in particular, the barrier level is typically substantially non-porous to gases such as dihydrogen or dioxygen, and most typically is non-porous to dioxygen. The barrier layer typically has a thickness in the range of 1 μm to 500 μm, more often 5 μm to 50 μm and more typically 20 μm to 25 μm. The permeability of the barrier layer partially relates to the thickness of the layer (as explained for the electrolyte layer described above). The thickness will vary depending on the choice of barrier layer but typically thicknesses of the barrier layer are described herein.

There is no particular restriction on the type of materials from which the barrier layer can be made. However, it is typically the case that the material has a melting point of greater than or equal to 450° C., more typically greater than 600° C. and more typically still greater than or equal to 650° C. These are the temperatures at which SOFCs are conventionally operated and the barrier layer needs to remain substantially solid either in pure form or in an oxidized form, in order to prevent contact between the reactive fluids and the substrate and prevent migration of the metal substrate material.

The fluids which are delivered to the SOFC via the gasket are typically gases and the fluids are typically air (which is delivered to the cathode side of the cell) and a fuel or reformate (typically containing hydrogen which is delivered to the anode side). Although air is typically the cathode side fluid used, any oxygen containing fluid which does not interfere with the electrochemical reaction may be used. The skilled person would be aware of the types of fuels that are compatible with a SOFC. Typical examples of fuel include, but are not limited to, carbon monoxide, unreformed or partially reformed hydrocarbon gases and hydrogen. Sources of fuels include natural gas, methane, propane, butane, methanol or renewable based fuels.

There is provided in a second aspect of the invention, a SOFC stack, wherein the SOFC stack comprises two or more SOFCs as described in the first aspect of the invention. Typically, when the SOFCs are assembled into a stack, the gaskets on each of the individual SOFCs are arranged to sealingly connect adjacent SOFCs together such that when a cathode fluid stream and an anode fluid stream are delivered to the SOFCs in the SOFC stack these streams are kept separate from one another and passed over the appropriate surfaces of the SOFC in order for the electrochemical reactions to occur.

There is also provided in a third aspect of the invention, a method of forming a metal supported SOFC according to the first aspect of the invention, comprising the steps of:

i) providing a metal substrate;
ii) applying a protective, non-porous layer to the air side of the metal substrate; and
iii) applying a gasket to the SOFC adjacent the metal substrate; wherein the protective, non-porous layer is applied to at least part of those metal substrate regions proximate to the gasket.

Typically, the method further comprises the steps of applying an anode layer to the substrate between steps i) and ii). Often, the method further comprises the steps of applying a cathode layer to the protective, non-porous layer after step ii). The protective, non-porous layer applied in step ii) is typically also applied to those regions between the gasket and the substrate.

The protective, non-porous layer is typically a barrier layer or alternatively, may be an electrolyte layer. When the protective, non-porous layer is an electrolyte layer, it is typically the case that method further comprises a step of applying a barrier layer to the electrolyte layer of step ii) in the region between the gasket and the electrolyte layer. Alternatively, the substrate may be coated with a barrier layer prior to application of the electrolyte layer, typically in the region between the gasket and the electrochemically active area of the SOFC to which an electrolyte layer can be subsequently applied. Alternatively, the barrier layer may be applied to the entire air side of the substrate, either including or excluding the active area of the cell, prior to application of the electrolyte layer.

Methods of forming the layers of the SOFC of the kind described in the present invention are described, for example, in GB 2 368 450A, GB 2 524 638, GB2 524 640, GB 2 456 445. Typically, the electrode and electrolyte layers are deposited by screen printing, spraying or jetting techniques or combinations thereof.

The term "active area of the SOFC" is intended to refer to those regions of the substrate where an electrochemical reaction occurs during operation. In the present invention, this is typically defined by the region of the substrate comprising apertures. In order for the SOFC to function, fuel reactant gas must be able to contact the anode layer. Fuel reactant gas reaches the anode layer through a plurality of apertures in the substrate, therefore, the active area of the SOFC may be considered to be that area defined by the plurality of apertures in the substrate. There may be more than one area of apertures on each metal substrate. Typically, the process may further comprise the step of providing a barrier layer. This barrier layer may be applied to particular regions of the electrolyte layer onto which the gasket can be located. The barrier layer may also encompass those regions proximate to the gasket, or may cover just those regions proximate to the gasket. Alternatively, the barrier layer may be applied to the gasket before the gasket is fixed to the electrolyte layer. The barrier layer applied to the gasket may be as a foil or a coating on foil.

There is also provided in a fourth aspect of the invention, the use of the SOFCs according to the first aspect of the invention or the SOFC stack according to the second aspect of the invention in the production of electricity and optionally heat.

BRIEF DESCRIPTION OF FIGURES

The invention will now be described by reference to the following figures and specific description.

FIGS. 13a, 13b and 13c. SEM images of polished cross sections revealing the inlet side of a stack layer after accelerated corrosion testing at 630° C. for 1000 operating hours. This stage of corrosion corresponds to about 12,000 hours of normal stack operation. Co—CGO electrolyte layer applied on substrate sintered into a fully dense coating, thereby, forming a stable and effective barrier against gasket induced substrate corrosion. CGO covered only half the width of the gasket on the air side of the substrate. The gasket on the fuel side was in direct contact with the steel, but did not cause any interfacial corrosion due to very low oxygen activity on reducing the environment side of the substrate.

FIG. 14. SEM images of polished cross sections revealing the inlet side of a stack layer after accelerated corrosion testing at 630° C. for 1,000 hours, showing fully dense Co—CGO electrolyte coating applied on substrate with an aluminium interlayer.

DETAILED DESCRIPTION

Figure 2:
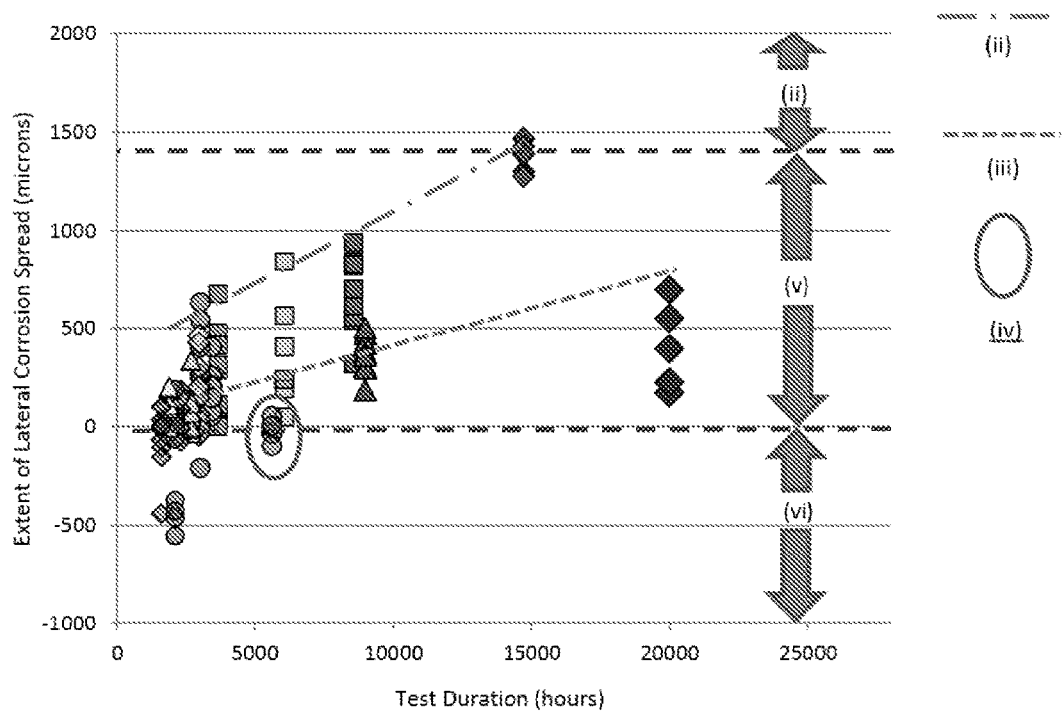
FIG. 2. Lateral propagation of substrate corrosion from gasket edge (measured by distance between corrosion front and active cell edge) determined on several cell layers of a number of stacks tested at 600° C. for durations up to 20,000 hours.
Figure 3:
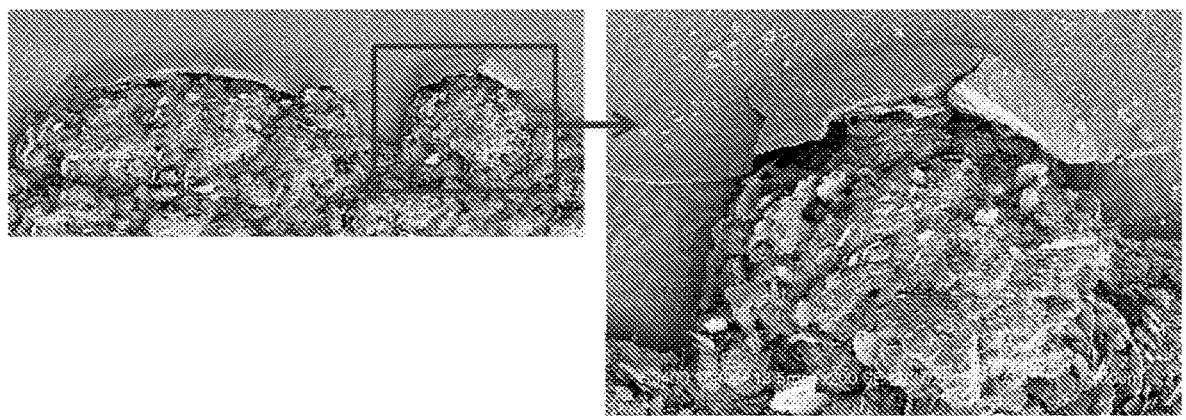
FIG. 3. SEM top-down images showing corrosion front entered into active cell region on inlet side of a cell tested in a stack test for 14,600 hours.
Figure 4:
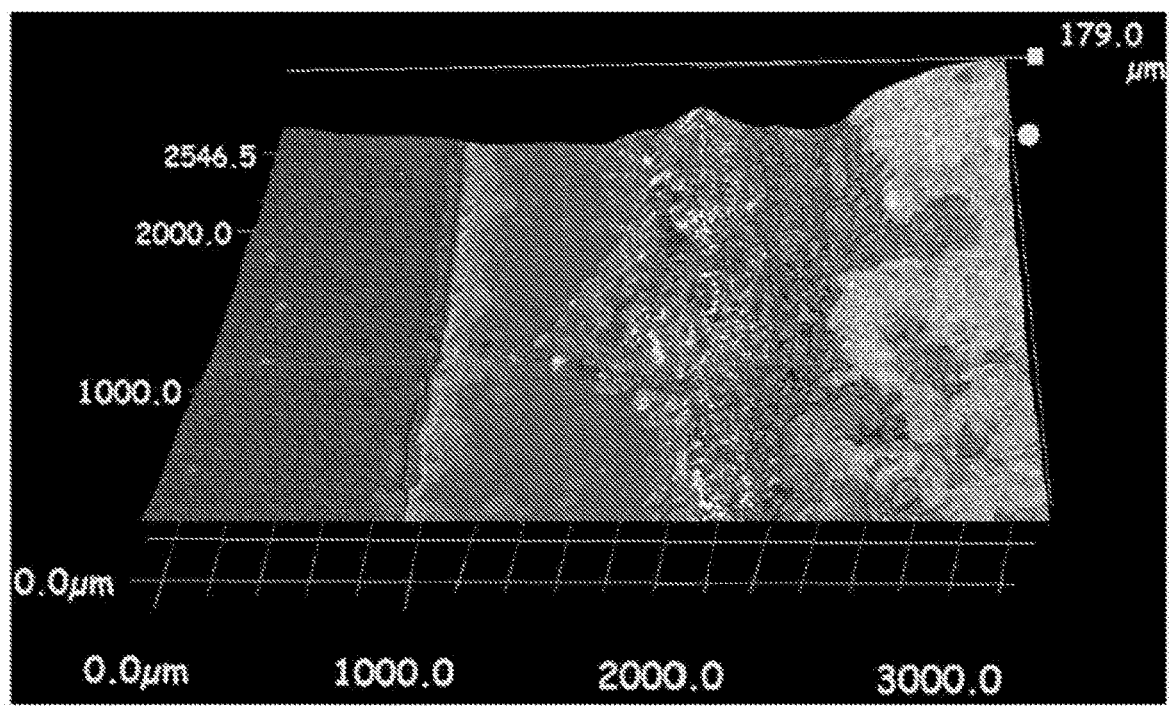
FIG. 4. Image showing the impact of loss of protective effect due to a surface crack where the crack enhanced corrosion which reached the active cell edge on a cell tested in a stack test for 8600 hours. The crack tip is indicated by an arrow.
Figure 5A:
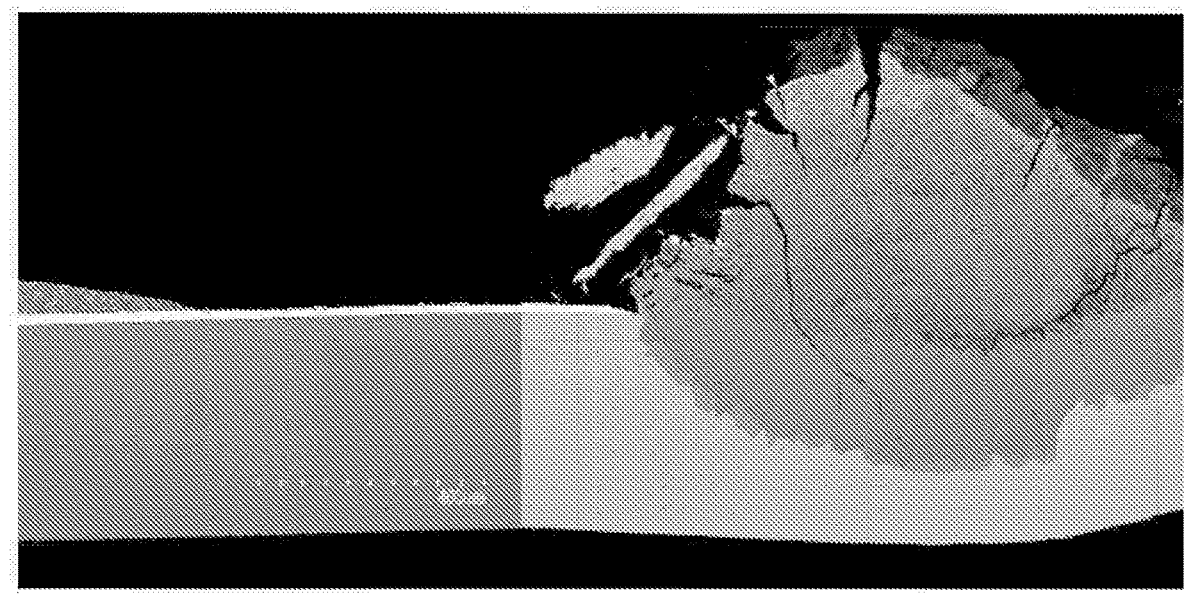
FIGS. 5a and 5b. Corrosion penetration into the substrate of a cell tested in a stack test for 20,000 hours. The corrosion penetration depth is about 200 μm.
Figure 5B:
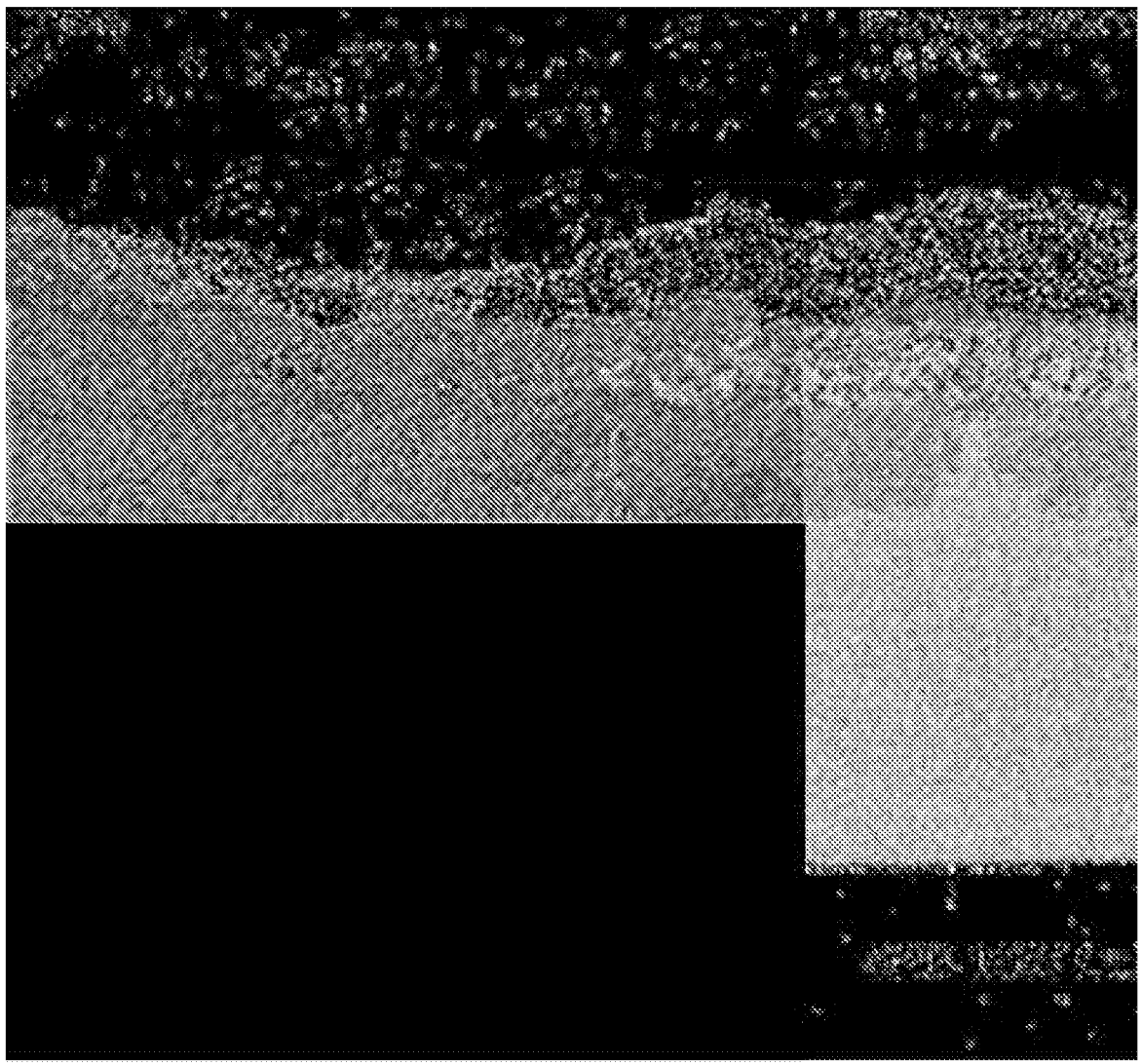
Figure 6:
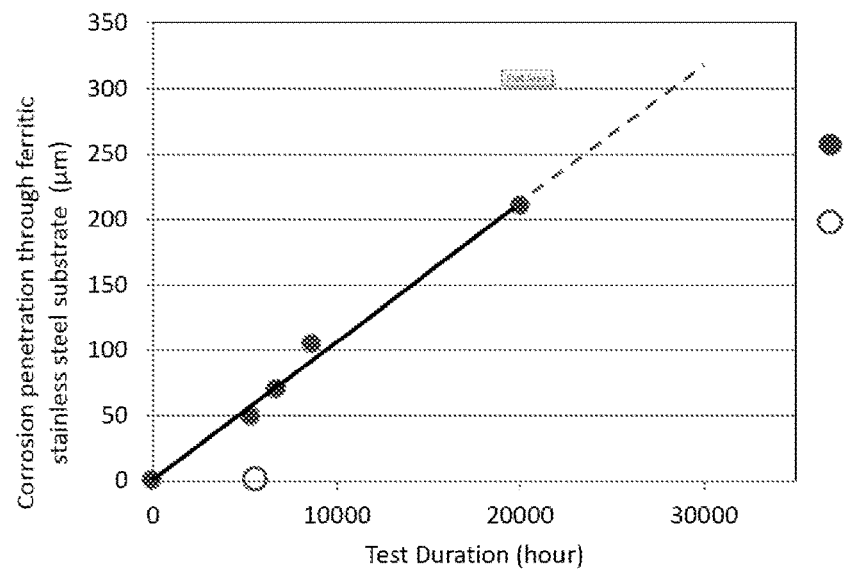
FIG. 6. Penetration depth of corrosion into substrate (across the thickness) measured at inlet gasket edge on SOFC from range of SOFC stack tests for durations up to and including 20,000 operating hours, wherein the full circle represents corrosion with thin coatings or no coatings and the hollow circle represents corrosion for the present invention.
Figure 7A:
FIGS. 7a and 7b. SEM images showing nodules of $K_2CrO_4$ phase formed on the steel surface near the inlet gasket. Arrows point to $K_2CrO_4$ deposits.
Figure 7B:
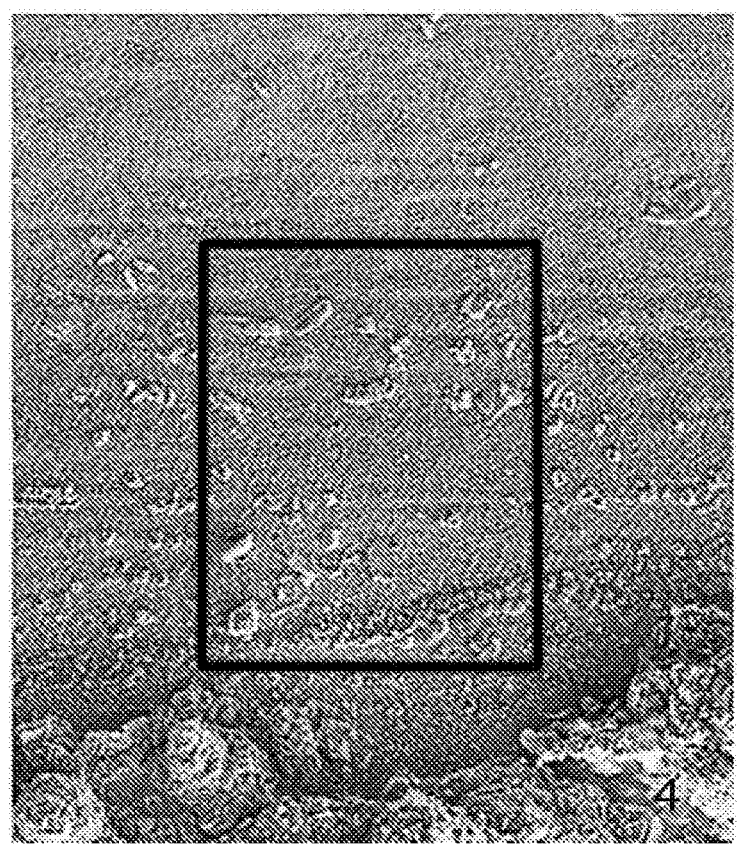

In FIG. 2, the numerals represent the following:
(i) Electrochemically active region of the cell;
(ii) Corrosion on uncoated or very thin coatings with known defects;
(iii) Corrosion with thin coatings and few defects;
(iv) Corrosion according to invention;
(v) Main electrolyte layer region surrounding electrochemically active region;
(vi) Region between gasket and electrolyte layer coated region.

Figure 9A:
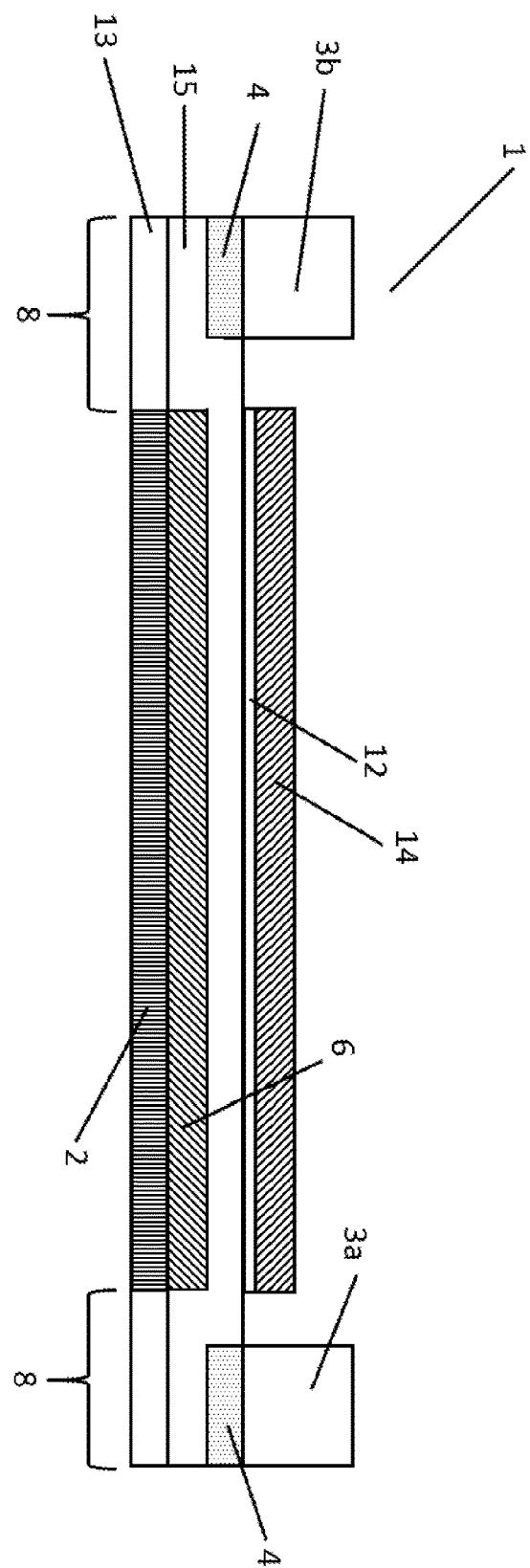
FIG. 9a. Schematic illustrating a cross section through a SOFC of the invention having an architecture adapted for mitigating of gasket-induced corrosion.

FIG. 9a shows a systematic diagram of a cross section through a metal supported SOFC 1 of the present invention similar to that described in GB 2 368 450A. The SOFC comprises a ferritic stainless steel substrate 13, made from a non-porous metal foil and consisting of a perforated region surrounded by a non-perforated region, where the perforated region is formed of apertures formed by laser-drilling thousands of holes through a region 2 of the substrate 13. A chromium oxide passivation layer (not shown) is formed between the substrate 13 and the anode layer 6. A nickel oxide and Co—CGO porous anode layer 6 is provided covering the at least the region 2 of the substrate 13 similar to that described in GB 2 368 450A, GB 2 517 927, GB 2 517 928. Over the anode layer 6 is deposited a Co—CGO electrolyte layer 15 (10 to 20 μm thick) similar to that described in GB 2 524 640, which overlaps the anode layer 6 onto the undrilled area 8 of the substrate 13, thus forming a seal around the edge of the anode layer 6. The cathode layer 19 (see FIG. 12) consists of several layers, a first thin cathode active layer 12 where the reduction of oxygen takes place, and a thicker cathode current collector layer 14 which allows current to be collected from the cell 1 in a stack (not shown). The gasket 3a, 3b is connected to the electrolyte layer 15 via an aluminium foil barrier layer 4. A metal interconnect (not shown) may be connected to the metal substrate by various means known in the art, such as by welding. The interconnect is usually attached to those parts of the cell not involved in the cell reaction, such as parts of the non-perforated region 8. The interconnect typically seals onto the gaskets 3a and 3b, with electrical contact being made between contact features on the metal interconnect and the current collector layer 14. The gasket is electrically insulating. This allows multiple SOFCs to be connected in a SOFC stack and creates an isolated reaction environment around each individual SOFC in the SOFC stack.

Figure 9B:
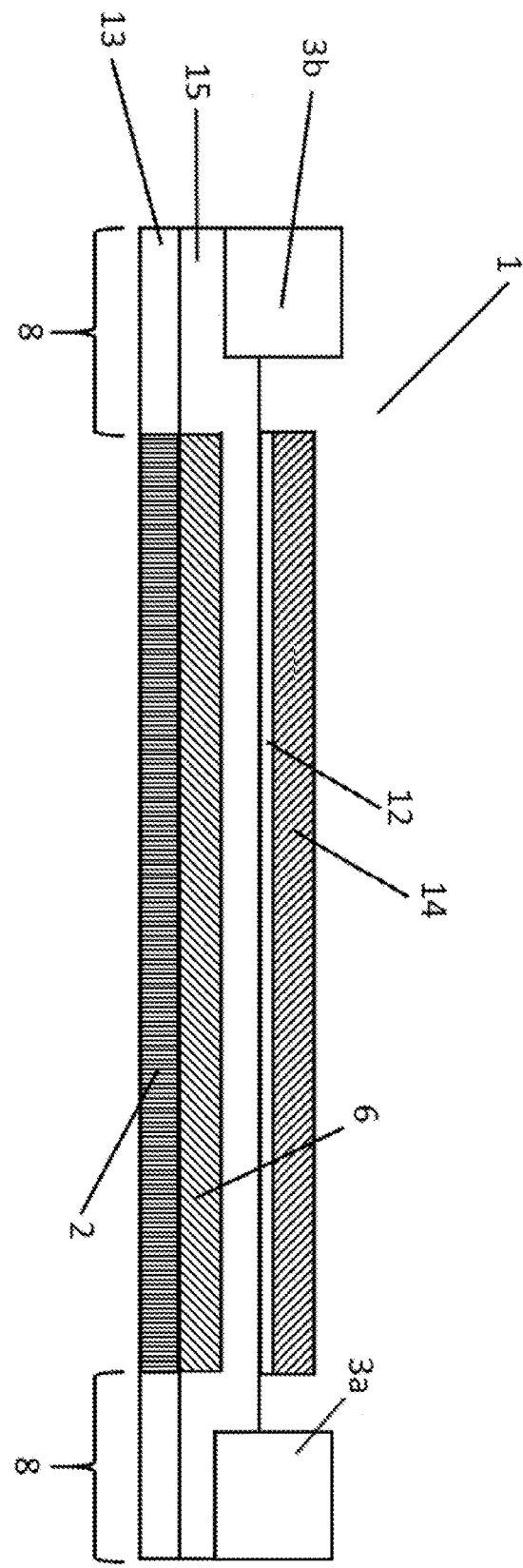
FIG. 9b. Schematic illustrating a cross section through a SOFC of the invention having an alternative architecture adapted for mitigating of gasket-induced corrosion.

FIG. 9b shows an alternative arrangement wherein the barrier layer 4 (shown in FIG. 9a beneath the gasket) is not used and the electrolyte layer 15 alone acts as a corrosion inhibiting layer.

Figure 10:
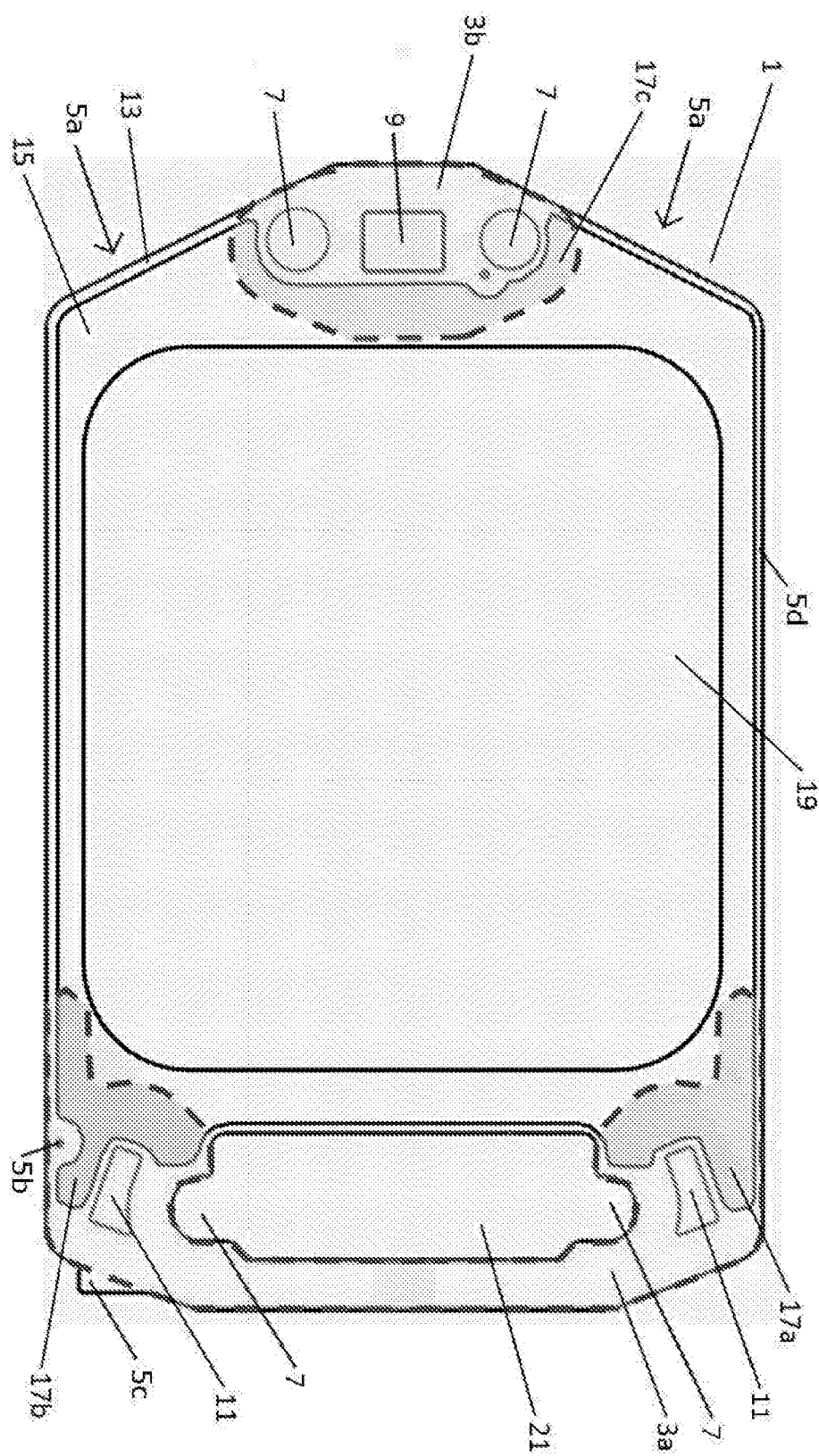
FIG. 10. Technical drawings showing the layout of a Co—CGO coating applied on a SOFC of the invention. Gasket contact regions are indicated with a shaded region outlined by broken lines.
Figure 11:
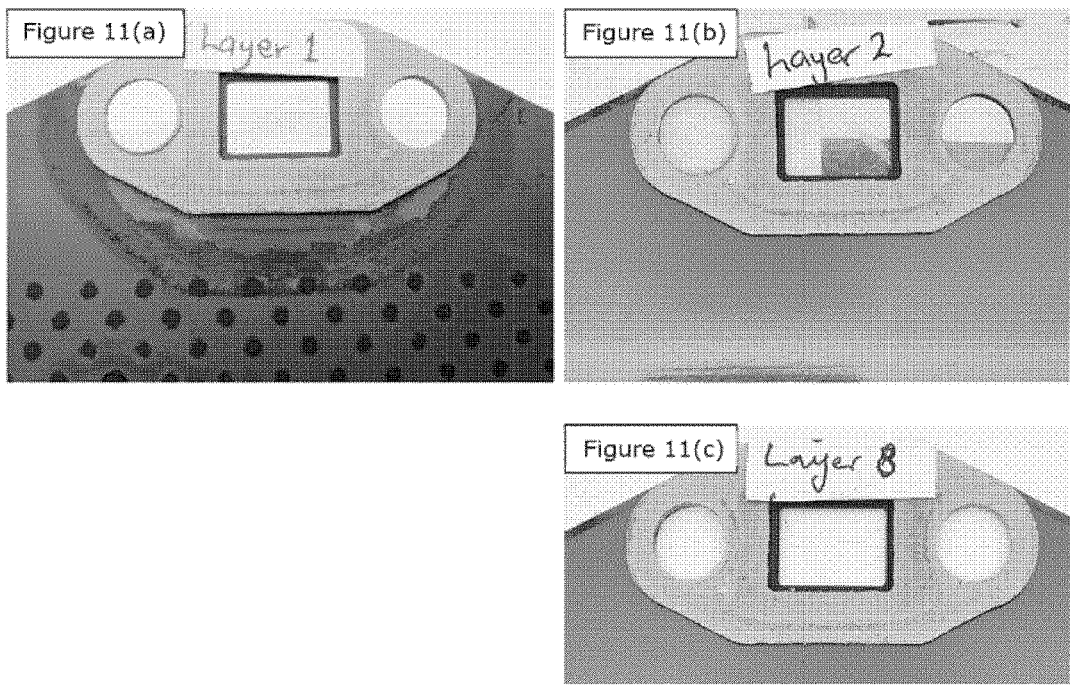
FIGS. 11a, 11b and 11c show the degree of corrosion developed around the inlet gasket on a SOFC of the invention, wherein the cell is subjected to accelerated corrosion testing at 630° C. for 1000 hours for (a) uncoated substrates, (b) coated substrates and coated substrates further comprising an aluminium foil barrier layer respectively.

FIG. 10 shows an exemplary embodiment of the invention consisting of a SOFC 1 comprising a single ferritic stainless steel substrate 13 which further comprises an electrolyte layer of cobalt doped cerium gadolinium oxide (Co—CGO) 15 coating the ferritic stainless steel substrate 13. A gasket 3a, 3b is applied to the electrolyte layer 15. The electrolyte layer 15 covers substantially all of the substrate, leaving a narrow region of uncoated substrate around the perimeter of the SOFC having a width of approximately 1 mm. The electrolyte layer 15 also extends underneath the gasket (see FIG. 9a). Also shown are those regions 17a, 17b, 17c proximate to the gasket 3a, 3b, where it is particularly desirable to include the electrolyte layer 15 coating. These are regions onto which impurities from the gasket are typically found to have leeched and deposited. A cathode layer 19 is deposited onto the surface of the electrolyte layer 15. The anode layer between the substrate and the electrolyte is not shown but would correspond approximately in shape to the cathode layer 19.

The gasket allows for air inlet 5a, compression means fixtures to pass through the gasket and clamp the SOFC stack layers for gas sealing and electrical contact 7, and air outlet 21. There is also provided a fuel inlet 9 and a fuel outlet 11. An uncoated region 5d is also provided in the SOFC which allows the SOFC to be handled during SOFC manufacture without contact being made with the electrolyte layer. The fiduciary mark 5b helps manufacture process step alignment. The feature 5c also helps with manufacture process step alignment and also provides a location for physical mark identifiers that enable quality data tracking during the manufacture and assembly of each SOFC and for detailed post-test analysis. Feature 5c is also used for arranging multiple SOFC into a SOFC stack as it can be made to cooperate with a receiving element (not shown) that keeps the SOFC in close appropriate alignment as the SOFC stack is assembled. The electrolyte layer has a thickness of approximately 12.5 μm and the gasket is fabricated from vermiculite-talc composition. In particular for SOFC operation in the 450° C.-650° C. range, the gaskets used can be vermiculite-talc based gaskets, such as those available from Flexitallic Ltd, including T866.

SOFC 1 was prepared by applying a screen-printing ink containing suspended particles of nickel oxide powder and Co—CGO powder to the substrate 13 (D90=0.7 to 1.2 μm, ratio of nickel oxide to Co—CGO in the ink being 1:1.5). The ink was screen printed onto a ferritic stainless steel substrate 13 using conventional methods, and dried in an oven to evaporate the solvents and set the binders thereby forming a dried, printed layer of thickness 9 to 15 μm. The dried, printed layer was heated in an oven to a temperature in the range 300° C. to 500° C., burning off the organic binders in the ink, leaving a green anode layer which was compressed using cold isostatic pressing at pressure of 300 MPa. The compressed green anode layer was placed in a furnace and heated to a temperature of 1020° C. in air atmosphere for 45 minutes, to produce a robust, well sintered anode layer 6. A Co—CGO electrolyte layer 15 was screen-printed onto the anode layer 6 and fired in a furnace at 1020° C. for 45 minutes. Finally, a zirconia layer was screen-printed onto the fired electrolyte layer 15 followed by screen-printing of the doped ceria layer and two cathodic layers before firing at a temperature of 1020° C. to produce cathode layer 19.

EXAMPLES

SOFC stacks using cells of the present invention are able to employ compression sealing to isolate fuel side reactant gases from air side reactant gases, such as by typically using T866 vermiculite-talc based gaskets supplied by Flexitallic Ltd. This compression sealing requires physical compression of the gaskets between the SOFCs in the SOFC stack using a compression force of 1-50 MPa, and more typically ~20 MPa compression at room temperature (i.e. in the range 5° C. to 30° C.). One skilled in the art will recognize that sealing force, sealing force application mechanism, gasket design and SOFC design will dictate the level of sealing force required. The SOFC shown in FIG. 10 employs tie-bars running through the SOFC stack layers to apply a compression force to the gaskets 3a and 3b. The compression tie-bars (not shown) run through the SOFC layers in locations 7 which are located to allow the stack design to apply an effective compression load for gas sealing and compression height to the gaskets.

Data from several SOFC stack tests has revealed that typical SOFC metal substrates undergo corrosion in and around the gasket contact region (those regions proximate to the gasket, such as regions 17a, b and c in FIG. 10) on the air side of the substrate, converting the affected areas of the substrate metal into porous oxide scales. The data generated from post-test characterization of several SOFC stack layers confirms that the steel surface in and around the gasket contact region on the air side is exposed to corrosive species containing potassium (K), fluorine (F) and silicon (Si) which are volatilized from the gasket on the air side of the SOFC operation. Despite some surface coverage of the steel on the air side with nano-metrically thin layers of electrolyte materials from the electrolyte interlayer and top CGO such as described (renown as interlayer wash off at cell edges), such thin and defective coatings are not capable of preventing corrosive effects of, for instance, K— and F— containing gas phase species. Corrosion is initiated by, for example, nucleation of $Fe_2O_3$ nodules on the top of defective regions at cell edges and grown by coalescence of the nodules.

The corrosion propagates in two ways, namely:

(i) Corrosion spreading on X-Y plane (i.e. lateral propagation across the cell surface) from gasket edge towards active cell region. Once corrosion is initiated, it continues during periods of operation, even continuing (though the rate of corrosion is slowed) under the electrolyte layer extended over steel surface.

(ii) Corrosion advancing along the Z-axis (i.e. penetration through the fuel across cell thickness) from the air side towards the fuel side of the substrate.

In both cases the corrosion effect mainly occurs by inward growth of Fe—Cr based oxides and outward growth of mainly $Fe_2O_3$, which are thought to be the products of outward Fe diffusion and inward oxygen-ion diffusion at sites where protective $Cr_2O_3$-spinel layers have become defective/non-protecting.

Figure 1:
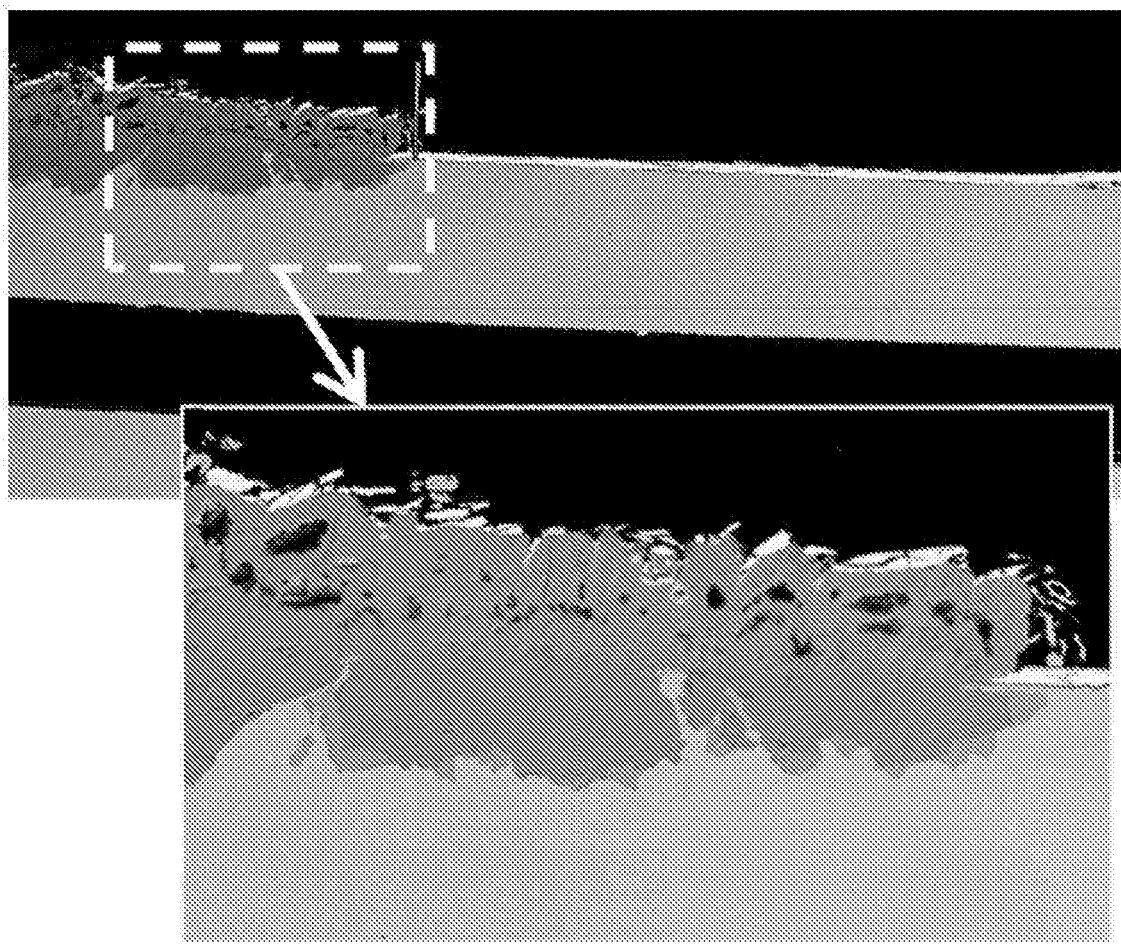
FIG. 1. SEM cross section images revealing corrosion products on inlet side of a metal substrate supported SOFC after 8,600 hours of stack testing in stack test. Corrosion penetration into the substrate is measured as being about 120 μm.

The features described above are exemplified by the SEM cross-section images in FIG. 1 which shows the corrosion products developed at a gasket edge on the inlet side of a SOFC tested in a SOFC stack for 8,600 hours of operation. The section shows a thin (<1 micron) electrolyte material which is a result of material "wash off" from the electrolyte forming process. These findings are complimented by 3D Keyence optical images revealing the appearance of corrosion front at gasket edge on a cell tested in another SOFC stack tested for 6,100 hours of operation.

As shown on SEM of FIG. 1, the corrosion propagated in X-Y and Z directions by coalescence and growth of $Fe_2O_3$ scale continuing under the thin coating layer.

Various examples of these features developed on SOFC cells tested in different SOFC stacks are depicted in the SEM images shown in FIGS. 12 to 17a-17d.

Mechanisms of Gasket Induced Corrosion

Figure 8:
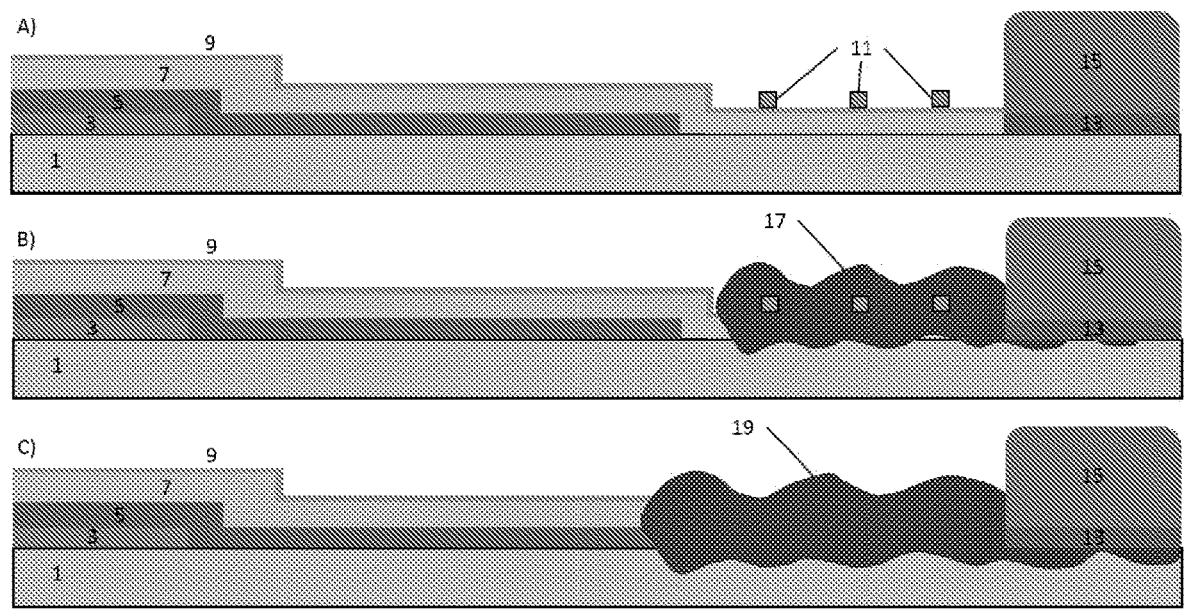
FIG. 8. A schematic illustrating the believed mechanism for the development of substrate corrosion through potassium reaction with $Cr_2O_3$ scale, and nucleation growth of $Fe_2O_3$ scale laterally at the surface and the inward growth of Fe—Cr-based oxide across metal substrate thickness. Substrate (1); anode (3); electrolyte (5); interlayer (7); $K_2CrO_4$ nuclei (11); interfacial corrosion zone (13); gasket (15); Fe-rich oxide growth at $K_2CrO_4$ nuclei (17); $Fe_2O_3$ growth (19). Figure shows effects after 200 hours, 3000 hours and 6000 hours from top to bottom respectively.

Several mechanisms were considered for gasket induced substrate corrosion. Without being bound by theory, the most probable mechanisms can be described by the following two propositions:

(i) Steam-aided chromium (Cr) depletion activates corrosion: steam released from the gasket due to residual fuel leak can cause local Cr volatilization on the substrate surface leading to degradation of protective $Cr_2O_3$ surface scale by Cr depletion. Corrosion is initiated once Cr depletion becomes large enough in one region to enable the nucleation of $Fe_2O_3$ nodules at the surface. Then the corrosion can progress with time by growth and coalescence of such nodules. The photograph of a cell shown in FIG. 8 indicates the steam effect around the inlet gasket which developed during corrosion tests at 630° C. for 1000 hours.

(ii) Volatilized gasket impurities activate corrosion: certain impurities, such as, K, F, Si, sulphur (S), can volatilize from the gasket, react with the $Cr_2O_3$ scale leading to development of defective sites where $Fe_2O_3$ scale can grow.

Both mechanisms are believed to operate together to produce the observed corrosion effects. The nature of interaction between fuel and volatile species inside the gasket still remains unknown. Nevertheless, it seems reasonable to assume that volatile species may react with hydrogen or water vapor formed where oxygen and hydrogen meet inside the gasket and activates emission of corrosion-causing species during heating in stacks. Elemental analysis carried out on several tested cells revealed traces of K, F and Si had formed compounds around the gasket contact regions, indicating that these elements are sourced from the gasket by volatilization and have interacted with the substrate surface to facilitate corrosion. Post-test analysis also revealed that K reacts with Cr of the surface scale and forms nodules of $K_2CrO_4$ phase on the steel surface, evident from the SEM-EDX data presented in FIG. 9a. K reacting with Cr of the surface scale appears to create critical sites for $Fe_2O_3$ nucleation on the steel surface. Then, the corrosion can propagate by coalescence and growth of $Fe_2O_3$ scale laterally at the surface and the inward growth of Fe—Cr-based oxide across steel thickness. These steps are illustrated in FIG. 10 based on microstructural observations.

Likewise, F reacting with hydrogen diffused through the gasket can form vapor of HF which is highly corrosive for steels and alloys. No direct evidence was found to verify fluorine induced substrate corrosion on tested substrates and cells. However, recent WDS analysis on CGO coated substrates tested for 1000 hours has revealed F enriched Sift phase deposited on CGO coating surface around gasket edges, suggesting the F effect on corrosion is a real one.

Manufacturing CGO Coatings on Substrates

A number of laser drilled metal substrates were subjected to the standard cleaning and TGO heat treatment processes. These substrates were then coated with the Co—CGO electrolyte ink by three-layer screen printing as applied to manufacture the electrolyte layers on cells. Each print was dried at 200° C. before the next print layer was added. This was followed by pressing and then standard air electrolyte firing at 1020° C. with a binder bum out step included.

The sintered electrolyte layers were 12.5 µm thick and fully dense without any sign of delamination, cracks or chipping damage. The CGO screen printing allowed CGO coatings to approach substrate edges very closely, as shown by the drawings in FIG. 12. A gap of 1 mm was left between the substrate edge and CGO coating edge in order to facilitate handling and avoid accidental damage of the coating during manufacturing.

Accelerated Corrosion Testing (ACT) of Co—CGO Coated Substrates

The Co—CGO coated substrates were subjected to the standard accelerated SOFC corrosion testing developed at Ceres Power Limited. The accelerated corrosion test mimics SOFC stack operation, i.e., all SOFC layers are built as dummy layers with interconnect and undrilled substrate exposed to a dual atmosphere provided by a continuous flow of moist air/moist $H_2$ in their respective channels in the SOFCs. The corrosion acceleration is caused by carrying out accelerated corrosion testing at 630° C. and exposure of air side of the stacks to moist air (which is atmospheric air drawn through a water bubbler). The corrosion assessments carried out using this accelerated corrosion test on uncoated substrates and comparing the results to SOFC subjected to real SOFC stack tests have revealed that the accelerated corrosion conditions applied in these tests provide approximately 12 times acceleration of gasket induced corrosion processes which are routinely found after real SOFC stack testing at temperatures in the range from 570° C. and 610° C. Thus an accelerated corrosion test of 1,000 hours is equivalent to normal SOFC operation of 12,000 hours.

In this work, a corrosion stack of nine layers comprising (i) uncoated substrates, (ii) Co—CGO coated substrates and (iii) Co—CGO coated substrates coupled with aluminium foils were assembled with Flexitallic T866 gaskets. The accelerated corrosion testing of the SOFC stack was carried out at 630° C. for 1,000 hours. Upon completion of the accelerated corrosion test, post-test characterization was carried out on selected cell layers by SEM characterization and EDX elemental analysis.

Co—CGO Coating Protects Substrate Against Corrosion

Uncoated substrates underwent heavy corrosion around gasket edges during accelerated corrosion testing at 630° C. for 1,000 hours, as exemplified by the SOFC image in FIG. 13a. Substrate corrosion started at gasket edges, propagated laterally by about 4 mm and penetrated in depth by about 120 µm. This stage of corrosion corresponds to about 12,000 hours of real SOFC stack operation. On the other hand, no corrosion developed on the Co-CGO electrolyte coated substrates which were tested in the same SOFC stack (see the pictures in FIGS. 13b and 13c and SEM cross-section images in FIGS. 14, 15 and 16).

Figure 12:
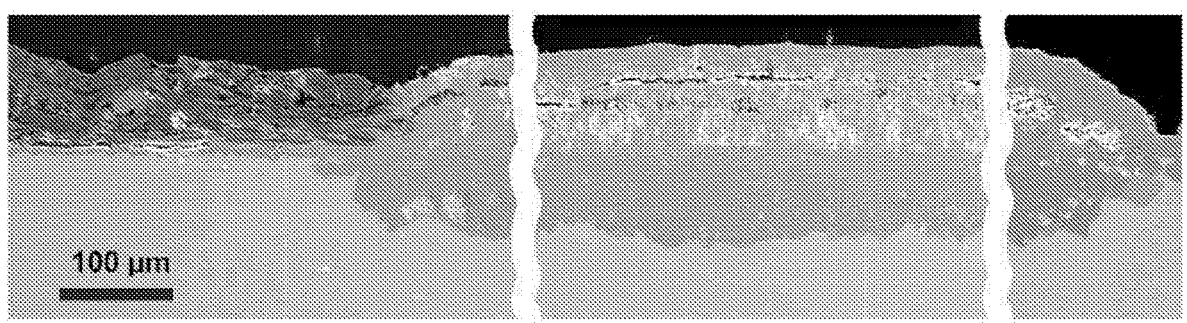
FIG. 12. SEM images of polished cross sections revealing the inlet side of a stack layer after accelerated corrosion testing at 630° C. for 1000 operating hours. Substrate corrosion started at gasket edges, propagated laterally by about 4 mm and penetrated in depth by about 120 μm. This stage of corrosion corresponds to about 12,000 hours of normal stack operation.
Figure 15:
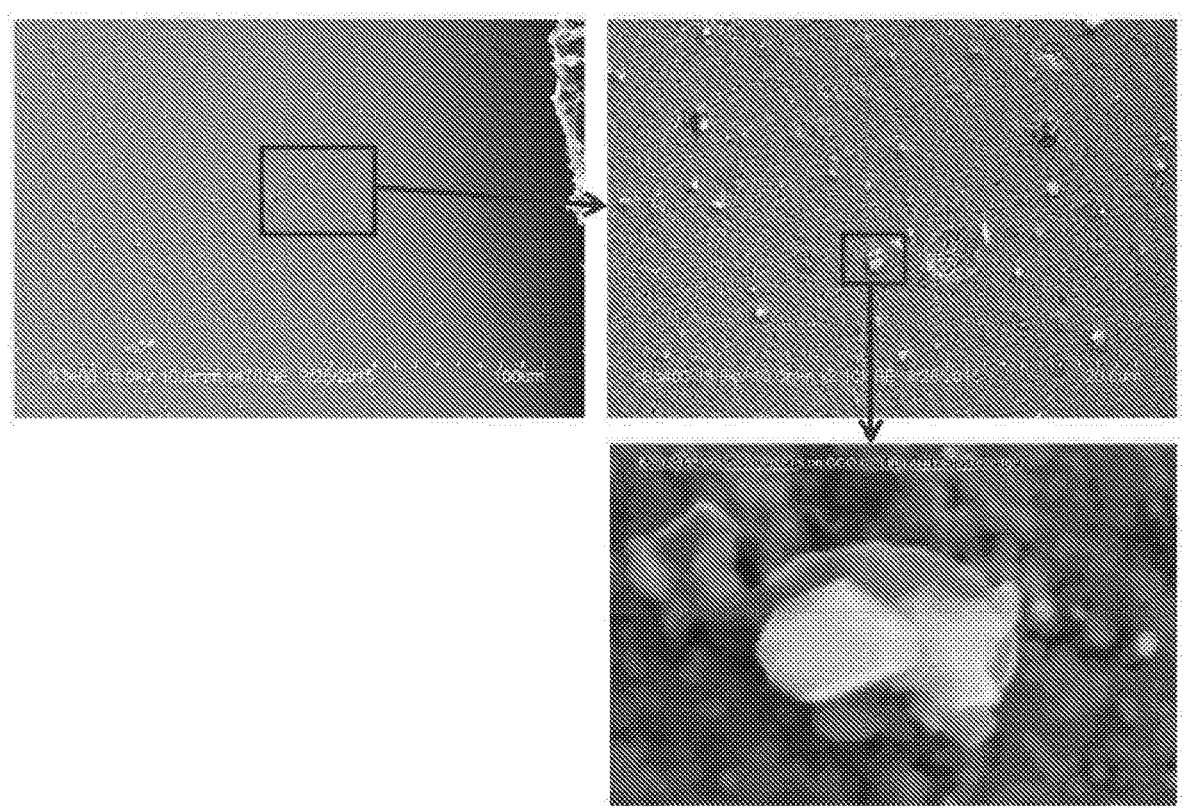
FIG. 15. Image showing fluorine containing $SiO_2$ impurity phase deposited on the CGO surface around Flexitallic T866 gasket area depicted from the air inlet side of the substrate. The crystalline growth of $SiO_2$ on CGO surface is resolved at high magnification.
Figure 16:
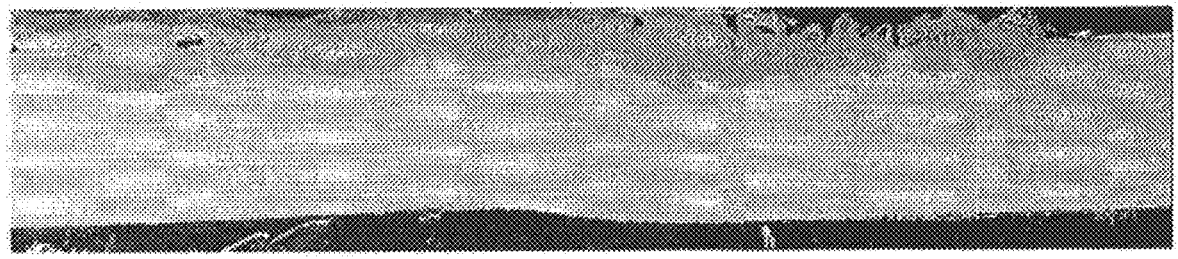
FIG. 16. SEM cross section images of a substrate tested in a stack at 600° C. for 8,600 hours.
Figure 17A:
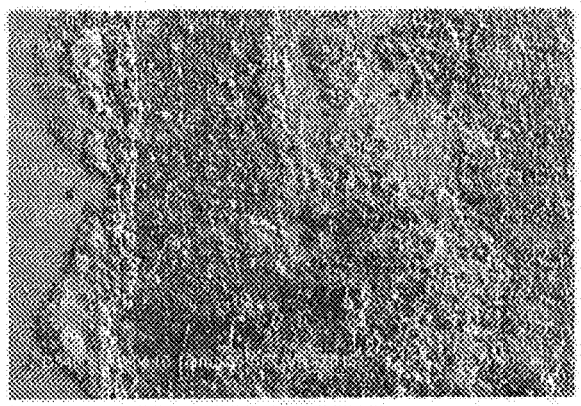
FIGS. 17a and 17b are SEM images showing corrosion products in a region near the inlet gasket on a cell tested in a stack layer tested for 6100 hours.
Figure 17B:
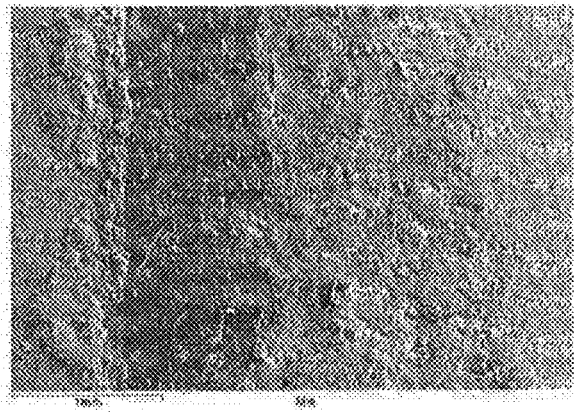
Figure 17C:
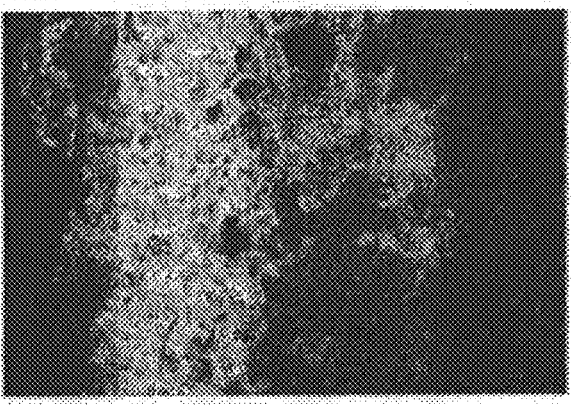
FIGS. 17c and 17d show elemental maps revealing the distribution of K and Si in the region shown in (a). In the composite image (b), the green regions indicate residual Flexitallic T866 gasket material reacted with chromia scale on the substrate surface and red regions indicate $K_2CrO_4$ surface layer formed by reaction of chromia scale with K volatilised from the gasket. The curved segments on the left side of the image in (a) are the regions of $Fe_2O_3$ growth into electrolyte.
Figure 17D:
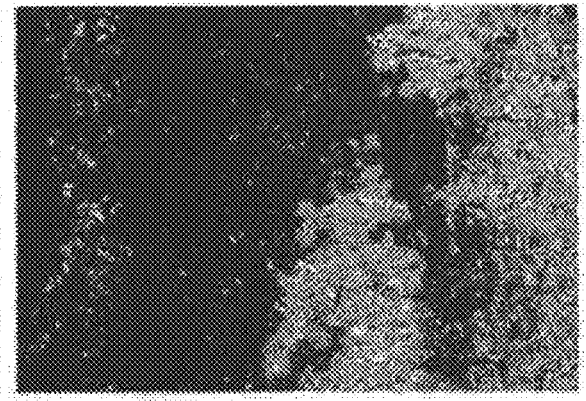

Placing an aluminium foil between the Flexitallic T866 gasket and Co—CGO coating aimed to provide a barrier between the gasket and the substrate to prevent any interfacial corrosion reaction in regions where the gasket would normally be in contact with bare substrate surface (the regions beneath the gasket shown in FIG. 12). The foil served the purpose well. It formed inert interfaces with both substrate steel and gasket and no sign of corrosion was found to develop in foil protected regions after testing (FIG. 16). Note that aluminium foil used was only 25 μm thick at stack assembly, which reduced to about 10 μm during stack testing by plastic deformation/creep under the gasket compression. This configuration provided a very effective barrier against substrate corrosion during exposure to accelerated corrosion testing at 630° C. for 1,000 hours.

Interaction of Volatilized Impurities with Co—CGO Coatings

Among main impurities which are believed to volatilize from T866 gasket, only F and Si were detected on the Co—CGO coating in the vicinity of the gaskets over the substrate surface. The impurity phase grown on the surface was crystalline Sift containing considerable amounts of F. The SEM images presented in FIGS. 17a-17d provide an example of F containing Sift crystals grown on Co—CGO surface. When looked at polished cross sections, the silica phase has no resolvable penetration into the Co—CGO coating under high resolution SEM inspection conditions. The elemental line scans also indicated absence of any considerable penetration of silica into the coating. It appears that Co—CGO coating provides a reliable barrier against the corrosive attack of, especially, F— and also Si— containing vapours vapors volatilized from the gasket.

Unless otherwise stated each of the integers described may be used in combination with any other integer as would be understood by the person skilled in the art. Further, although all aspects of the invention preferably "comprise" the features described in relation to that aspect, it is specifically envisaged that they may "consist" or "consist essentially" of those features outlined in the claims. In addition, all terms, unless specifically defined herein, are intended to be given their commonly understood meaning in the art.

Further, in the discussion of the invention, unless stated to the contrary, the disclosure of alternative values for the upper or lower limit of the permitted range of a parameter, is to be construed as an implied statement that each intermediate value of said parameter, lying between the smaller and greater of the alternatives, is itself also disclosed as a possible value for the parameter.

In addition, unless otherwise stated, all numerical values appearing in this application are to be understood as being modified by the term "about". It should be appreciated that the processes and apparatus of the invention are capable of being implemented in a variety of ways, only a few of which have been illustrated and described above.

The invention claimed is:

1. A metal supported solid oxide fuel cell (SOFC) comprising;
   a metal substrate supporting the solid oxide fuel cell, wherein the metal substrate is not an electrochemically active layer;
   an electrolyte layer adjacent the metal substrate; and
   at least one gasket through which fluids are delivered to and/or from the metal supported solid oxide fuel cell;
   wherein the electrolyte layer provides a non-porous protective coating adjacent the metal substrate preventing corrosion of the metal substrate; and
   wherein at least a portion of the electrolyte layer is positioned between the metal substrate and the gasket.

2. The fuel cell of claim 1, wherein the electrolyte layer is positioned on the metal substrate in regions proximate to the gasket.

3. The fuel cell of claim 2, wherein at least a portion of the electrolyte layer is positioned on the metal substrate in regions that are equal to or less than 2mm from the gasket.

4. The fuel cell of claim 3, wherein at least a portion of the electrolyte layer is positioned on the metal substrate in regions that are equal to or less than 1mm from the gasket.

5. The fuel cell of claim 2, wherein the electrolyte layer coats an air side of the metal substrate, covering the region between the gasket and an electrochemically active region of the SOFC.

6. The fuel cell of claim 1, wherein the electrolyte layer comprises a cerium-gadolinium oxide.

7. The fuel cell of claim 6, wherein the cerium-gadolinium oxide further comprises cobalt.

8. The fuel cell of claim 1, wherein the gasket comprises corrosion promoting agents.

9. The fuel cell of claim 8, wherein corrosion promoting agents are selected from: group I elements, group VII elements, silicon, sulfur, or combinations thereof.

10. A fuel stack comprising two or more of the fuel cells according to claim 1.

11. A method of making a fuel cell of claim 1, comprising the steps of:
    i) providing the metal substrate;
    ii) applying the protective, non-porous coating comprising the electrolyte layer to the metal substrate; and
    iii) applying a gasket to the fuel cell adjacent the metal substrate;
    wherein the protective, non-porous coating is applied to at least part of those regions proximate to the gasket.

12. The method of claim 11, wherein the coating in step (ii) is applied as the same coating that forms the main electrolyte layer between an anode layer and a cathode layer of the SOFC.

13. The fuel cell of claim 1, wherein the electrolyte layer is positioned over a whole surface of the metal substrate such that it is positioned between an electrochemically active layer of the SOFC and the metal substrate.

14. The fuel cell of claim 1, wherein the electrolyte layer is the same electrolyte layer as that used to form an electrolyte layer-between an anode and a cathode of the SOFC.

15. The fuel cell of claim 1, wherein the electrolyte layer comprises:
    a first electrolyte layer positioned over a whole surface of the SOFC metal substrate such that the first electrolyte layer is positioned between an electrochemically active layer of the SOFC and the metal substrate; and
    a second electrolyte layer that is the same electrolyte layer as that used to form an electrolyte layer between an anode and a cathode of the SOFC; and wherein
    the second electrolyte layer extends between the anode and the cathode to cover the first electrolyte layer.

16. The fuel cell of claim 1, wherein the electrolyte layer has a thickness of greater than >2μm.

* * * * *